Figure 1:
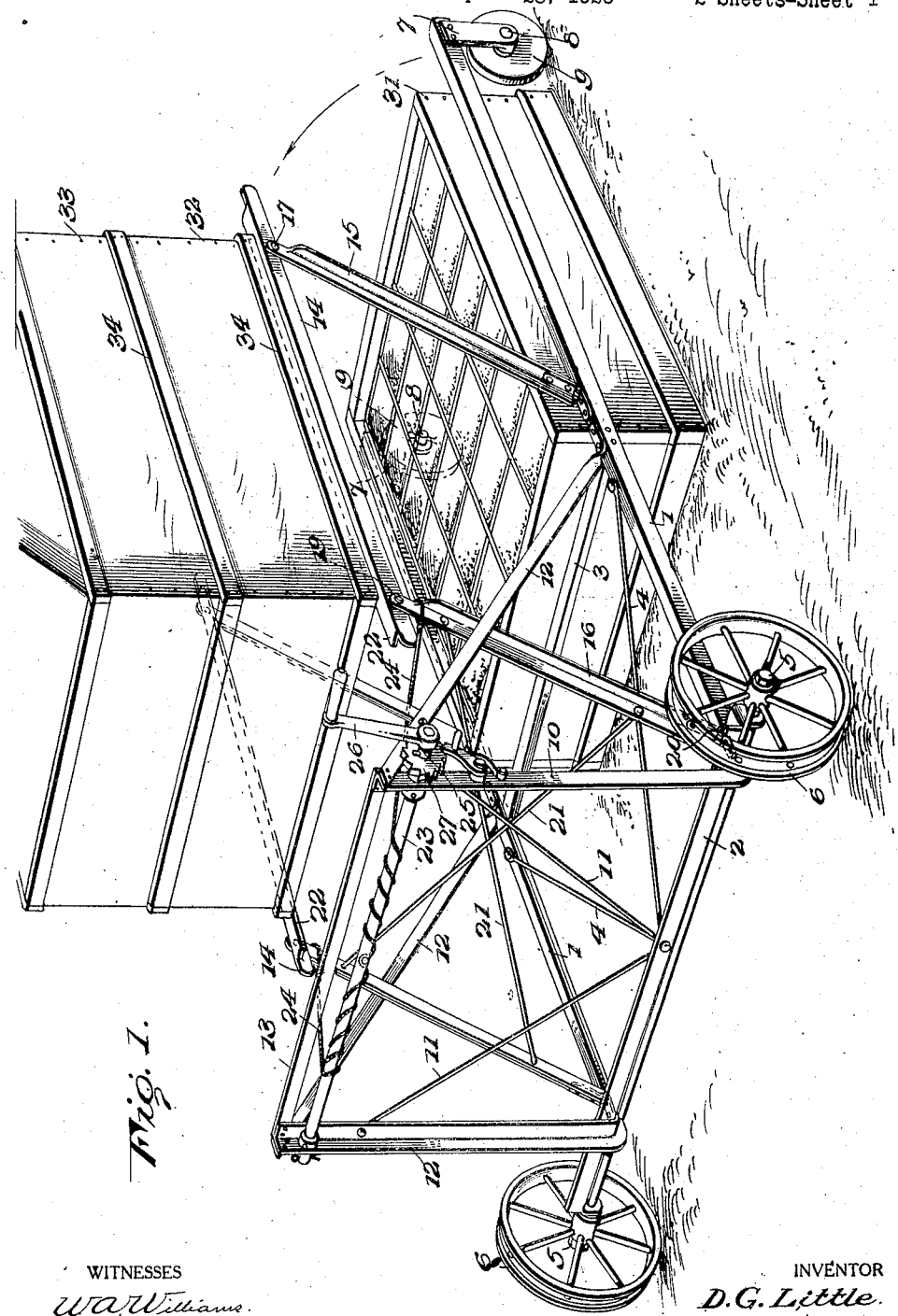

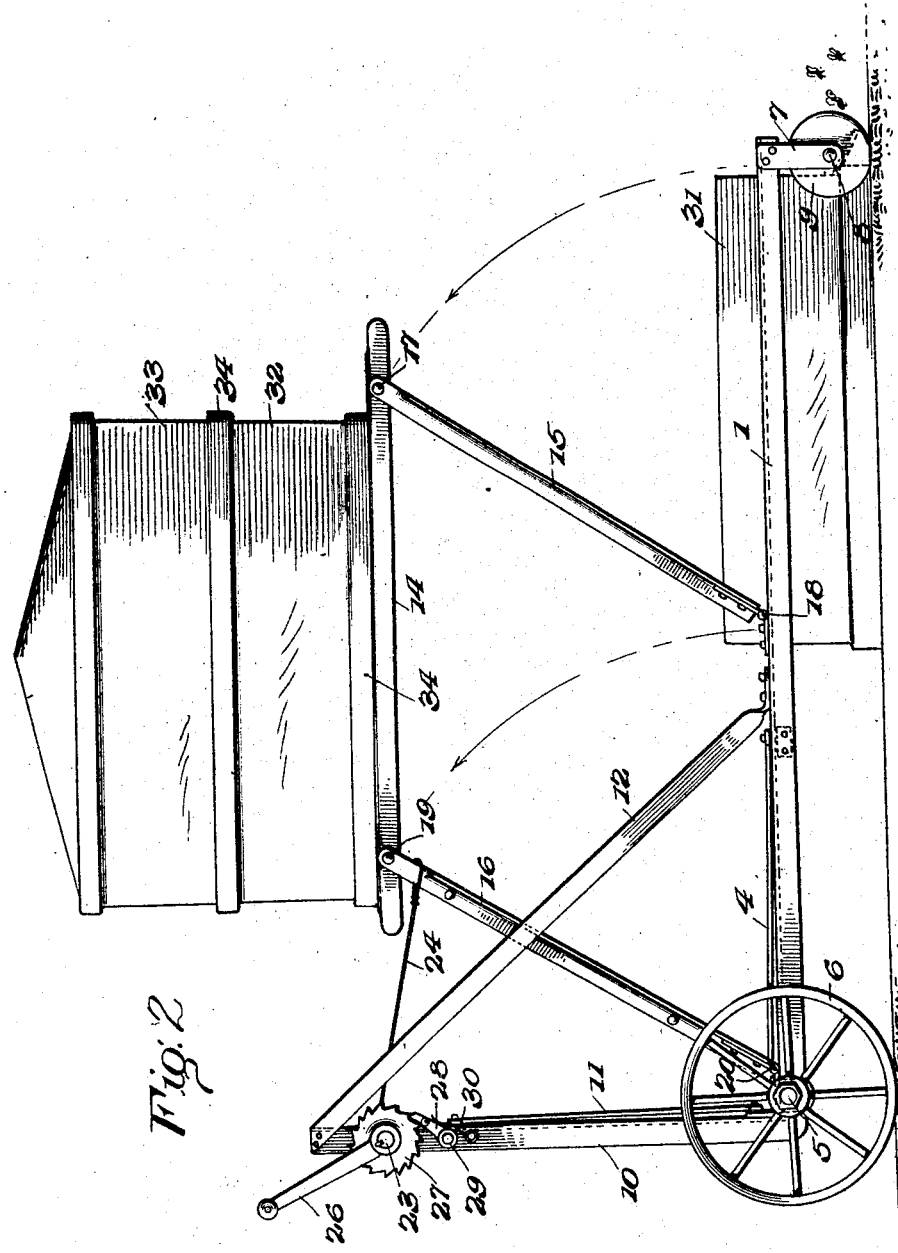

Patented Mar. 22, 1927.

1,622,201

UNITED STATES PATENT OFFICE.

DANIEL G. LITTLE, OF HARTLEY, IOWA.

PORTABLE LIFTER FOR BEEHIVES.

Application filed April 28, 1926. Serial No. 105,244.

My invention relates generally to improvements in lifting devices, more particularly to a lifting device for a section or sections of a sectional bee hive, and it consists in the combinations, constructions and arrangements herein described and claimed.

Bee hives ordinarily comprise a plurality of superposed sections, the lower of which is the brooder section of the hive and the remaining sections are storage sections for honey. These storage sections must be lifted from the brooder section when they have been filled with honey in order to permit empty storage sections to be placed on the brooder section between the latter and the filled storage sections which then are supported by the empty storage sections. This operation must be repeated or performed whenever it is necessary to provide additional storage space for honey in the hive.

The operation of lifting the filled storage sections manually is difficult and laborious since the filled storage sections may weigh any where from 50 to 100 lbs. and therefore considerable labor is involved in lifting the filled sections of a plurality of hives. Moreover, the lifting of filled sections of the hive manually may result in injury to such sections or to the workman who is lifting them and usually disturbs and may cause injury to the bees which are in the filled sections at the time they are lifted.

A general object of the present invention is to effect economy in the time and labor which are required to lift filled storage sections of a hive from the lower or brooder section of the hive and to accomplish the lifting of the filled storage sections of the hive without likelihood of injury either to the workman or to the bees which are within the lifted storage sections.

A more specific object of the present invention is to provide a device which can be moved quickly and easily from place to place and which affords facilities for lifting filled storage sections of a hive and for supporting these lifted sections in raised position while empty storage sections are placed on the lower or brooder section of the hive and then for lowering the lifted sections in place on the empty storage sections which are superimposed on the brooder section of the hive.

A further object of the invention is the provision of a lifting device of the character described which is simple in construction, reliable in use, and thoroughly practical commercially.

Other objects and advantages of the invention will be apparent from the following description, considered in conjunction with the accompanying drawings, in which Figure 1 is a perspective view of the improved lifting device in use, showing a plurality of storage sections in raised position.

Figure 2 is a side elevation of the structure exibited in Figure 1.

The supporting structure of the improved lifting device includes a base which comprises a pair of horizontal side bars 1 which are connected at one end of the base by a cross bar 2. The side bars 1 of the base also are connected by a second cross bar 3 which is located intermediate the ends of the base and preferably nearer to the ends of the bars 1 which are connected by the bar 2 than to the opposite ends of the bars 1. The side bars 1 and the cross bars 2 and 3 are joined together in any suitable known manner so as to produce a strong and rigid base structure. The end of the base at which the cross bar 2 is located will hereinafter be referred to as the rear end of the base. The base is open between the side bars 1 from the front end of the base to the cross bar 3 for a purpose to be presently described. The side bars 1 of the base may be stayed to the rear cross bar 2 by the stay rods 4 which are located rearwardly of the cross bar 3 as clearly shown in Figure 1.

The end portions of the cross bar 2 extend laterally of opposite sides of the base and support axially aligned axles 5 on which are mounted the rear wheels 6. The forward end portions of the side bars 1 of the base carry depending hanger bars or brackets 7 which in turn carry the aligned front axles 8 on which the front wheels 9 are mounted. The base thus is supported on wheels and may be moved readily from place to place.

A pair of transversely spaced standards 10 are upstanding on the rearward end portion of the base and preferably are joined at their lower ends to the rear cross bar 2 at the places of juncture of the rear cross bar 2 with the rearward ends of the side bars 1 of the base. The standards 10 may be stayed to the rear cross bar 2 by inclined stay rods 11 and the upper end portions of the standards 10 also preferably are stayed to the side bars 1 of the base by the inclined brace bars 12. The standards 10 also preferably are connected at their upper ends and are stayed to each other by a cross bar 13.

A readily portable supporting structure which is light in weight and at the same time strong and durable thus is produced.

The lifting structure of the device comprises a pair of horizontal supporting bars 14 and pairs of front and rear vertically swingable pivoted lifter bars 15 and 16, respectively, by means of which the supporting bars 14 are supported on the side bars 1 of the base. The front lifter bar 15 is connected at its upper end by a horizontal pivot element 17 to the forward end portion of the associated supporting bar 14 at the outer side of the latter and each lifter bar 15 is attached at its opposite end to the corresponding side bar 1 by a hinge 18 having a horizontal pintle.

The connection of each lifter bar 15 with the corresponding side bar 1 of the base is at the upper side of the side bar 1 and intermediate the length of the latter. Each lifter bar 16 is connected at its upper end by a horizontal pivot element 19 to the rearward end portion of the corresponding supporting bar 14 at the outer side of the latter and is attached at its opposite or normally lower end to the rearward end portion of the associated side bar 1 of the base by a hinge 20 which is similar to the hinge 18. The arrangement is such that the lifter bars 15 and 16 at each side of the base will remain parallel with each other at all times and the supporting bars 14 at the upper ends of the associated lifter bars 15 and 16 will be horizontal at all times and may be moved in a vertical plane from a level slightly above that of the horizontal side bars 1 of the base to a level which is located above the base a distance nearly as great as the length of the lifter bars 15 and 16. The length of the lifter bars 15 and 16 is approximately equal to the distance from the connection of the lower end of each bar 15 with the corresponding side bar 1 to the front end of that side bar 1, whereby the front ends of the supporting bars 14 will be substantially flush with the front ends of the side bars 1 of the base when the supporting bars 14 are in their lowermost position. The lifter bars 16 are connected and stayed to each other by crossed inclined stay rods 21 so that all the lifter bars and the supporting bars 14 will move vertically in unison when motion is imparted to any one of the members of the lifting structure.

Each supporting bar 14 preferably is right angular in cross section and includes an inwardly extending horizontal flange 22 at its upper edge. With the construction that has been described for supporting the supporting bars 14 on the side bars 1 of the base, the flanges 22 of the supporting bars 14 will be disposed inwardly of the vertical planes of the inner faces or edges of the side bars 1.

The means for operating the lifting structure or frame of the device includes a shaft 23 which is journaled adjacent to its opposite ends in aligned openings in the upper end portions of the standards 10. Cables 24 are attached to the upper end portions of the lifter bars 16 and are passed over the shaft 23 and secured to the latter. The cables 24 are of sufficient length to permit swinging of the bars 16 from substantially horizontal positions on the base bars 1 to substantially vertical positions.

The shaft 23 extends at one end laterally of the adjacent standard 10 as indicated at 25. A crank handle 26 is secured to the extended end portion 25 of the shaft 23. A ratchet wheel 27 is secured to the extended end portion 25 of the shaft 23 at the outer side of the adjacent standard 10. A holding pawl 28 is connected by a horizontal pivot element 29 with the adjacent standard 10 and is pressed by a spring 30 against the teeth of the ratchet wheel 27 to releasably hold the shaft 23 against rotation about its axis in one direction.

From the foregoing description of the various parts of the device, the operation thereof may be readily understood. As hereinbefore stated, the device is adapted for use with sectional bee hives, each of which may comprise a lower or brooder section 31 and a plurality of storage sections, such as indicated at 32 and 33 respectively in Fig. 1, the storage sections being supported by the brooder section on which they are stacked. Each storage section of a bee hive of the type referred to is provided with an outwardly extending strip 34 on the body of the section at the lower edge of each side wall of the section. These strips may be termed flanges, since obviously they may be integral with the walls of the hive. The distance between the inner edges of the side bars 1 of the base of the device forwardly of the cross bar 3 is slightly greater than the width of the lower or brooder section 31 of a bee hive of the type referred to so that the device may be moved on its wheels until the free forward end portions of the side bars 1 of the base of the device straddle the brooder section of the bee hive. The height of the brooder section is greater than that of the base bars 1. The distance between the inner edges of the flanges 22 of the supporting bars 14 of the device is but slightly greater than the width of the body of any one of the sections of the bee hive and is less than the distance between the outer edges of the side strips or flanges 34 on the body of any one of the sections of the hive. The supporting bars 14 will be disposed in position to underlie the flanges 34 of the lowermost storage section that is to be lifted at the time the device is moved to position to straddle a hive and therefore the flanges 22 of the supporting bars 14 will extend under the flanges 34 of the lowermost storage section of the hive that is to be lifted. The storage sections of the hive above the level of the supporting bars 14 then will be raised from position on the lower section of the hive when the lifting structure of the device is actuated to effect movement of the supporting bars in an upward direction. This upward movement of the supporting bars 14 of the lifting structure of the device and of the sections of the hives that are supported by the supporting bars 14 can be effected conveniently by manipulating the crank handle 26 to wind the cables 24 on the shaft 23. The engagement of the pawl 28 with the ratchet wheel 27 will prevent accidental return rotary motion of the shaft 23 and the lifting frame therefore will remain in raised position and the lifted sections of the hive will be supported in raised position until the pawl 28 has been disengaged from the ratchet wheel 27 to permit the lifting frame and the sections of the hive thereon to be lowered. The sections of the hive which are supported on the lifting frame will be maintained horizontal while they are being lifted from position on the lower section of the hive and therefore the contents of the raised sections of the hive will not be disturbed. When the lifting frame is in raised position as shown in Figures 1 and 2, empty storage sections not shown, may be placed on the lower section 31 of the hive and the lifting frame then may be lowered slowly until the sections of the hive which have been raised are lowered to position on the interposed empty storage sections.

In the event that the hive sections which are to be lifted do not have the aforesaid flanges 34, cross angle rest bars may be placed under the front and rear edges of the lowermost section that is to be lifted with the ends of the cross rest bars disposed on the flanges 22 of the bars 14 of the lifter, after which the operation will be the same as hereinbefore described.

Obviously, my invention is susceptible of embodiment in forms other than that illustrated in the accompanying drawing and I therefore consider as my own all such modifications and adaptations of the form of the device herein described as fairly fall within the scope of the appended claims.

I claim:—

1. A lifting device of the character described comprising a base, said base including a pair of side bars, a cross bar connecting the rearward ends of the side bars, and an intermediate cross bar between said side bars, said base being open between said side bars from the forward ends of the side bars to said intermediate cross bar, wheels at the opposite ends of said side bars for movably supporting said base, the forward end portions of said side bars being adapted to straddle the lower section of a sectional beehive, a lifting frame comprising a pair of horizontal supporting bars, and pairs of front and rear lifter bars, the front lifter bars being attached pivotally to the front end portions of the supporting bars and being swingingly attached at their normally lower ends to said side bars of the base intermediate the length of said side bars, the upper end portions of the rear lifter bars being pivotally attached to the rear end portions of said supporting bars and the lower end portions of said lifter bars being swingingly attached to the rearward ends of said side bars of the base, said front and rear lifter bars at each side of the base being parallel, said supporting bars of the lifting frame having inwardly extending flanges at their upper edges, extending beyond the vertical planes of the inner edges of said side bars of the base, stay rods between the rear lifter bars, whereby all of said lifter bars will move in unison, standards on the rearward end portions of said side bars of the base, a transverse shaft rotatably supported by the upper end portions of said standards, and cables connected at their forward ends to the upper end portions of the rear lifter bars and attached at the rearward ends to said shaft.

2. A lifting device of the character described comprising a base, said base including a pair of side bars, a cross bar connecting the rearward ends of the side bars, and an intermediate cross bar between said side bars, said bars being open between said side bars from the forward ends of the side bars to said intermediate cross bar, wheels at the opposite ends of said side bars for movably supporting said base, the forward end portions of said side bars being adapted to straddle the lower section of a sectional beehive, a lifter frame comprising a pair of horizontal supporting bars, and pairs of front and rear lifter bars, the front lifter bars being attached pivotally to the front end portions of the supporting bars and being swingingly attached at their normally lower ends to said side bars of the base intermediate the length of said side bars, the upper end portions of the rear lifter bars being pivotally attached to the rear end portions of said supporting bars and the lower end portions of said lifter bars being swingingly attached to the rearward ends of said side bars of the base, said front and rear lifter bars at each side of the base being parallel, said supporting bars of the lifting frame having inwardly extending flanges at their upper edges, extending beyond the vertical planes of the inner edges of said side bars of the base, stay rods between the rear lifter bars, whereby all of said lifter bars will move in unison, standards on the rearward end portions of said side bars of the base, a transverse shaft rotatably supported by the upper end portions of said standards, cables connected at their forward ends to the upper end portions of the rear lifter bars and attached at the rearward ends to said shaft, an operating handle secured to said shaft, a ratchet wheel secured on said shaft, and a pivoted pawl carried by one of said standards in position to engage with the teeth of said ratchet wheel to releasably hold said shaft against rotation in one direction about its axis.

DANIEL G. LITTLE.